Patented Oct. 30, 1945

2,388,087

UNITED STATES PATENT OFFICE 2,388,087

PROCESS OF ACID-TREATING A THERMALLY CRACKED PETROLEUM DISTILLATE

William J. Ryan, Wilmington, and Marcus T. Kendall, Long Beach, Calif., assignors to The Texas Company, New York, N. Y., a corporation of Delaware No Drawing. Application July 10, 1943, Serial No. 494,260

9 Claims. (Cl. 196—40)

This invention relates to the treatment of hydrocarbon oils, and especially to the acid treatment of cracked petroleum distillates.

It is conventional to subject thermally cracked petroleum distillates, such as pressure distillates, to treatment with sulfuric acid. This treatment is generally carried out with the use of relatively strong sulfuric acid of about 66° Baumé having an acid concentration of about 93 per cent $H_2SO_4$, and it is designed to remove diolefins and sulfur compounds from the distillates. However, the acid treatment also results in the polymerization of other compounds in the distillate and, therefore, after separation of the acid sludge and neutralization, it is necessary to rerun the product to separate high boiling point polymerized bodies.

A different type of acid treatment is disclosed in U. S. Patent 2,164,771 to M. T. Kendall, one of the present applicants, comprising treating a cracked distillate with sulfuric acid of a strength of 55 and 60 per cent $H_2SO_4$, and especially about 57 per cent. In this treatment, substantially all of the inherent gum is removed from the distillate, while, at the same time, polymerization resulting in the formation of synthetic gum is avoided.

It has been proposed to employ in the treatment of hydrocarbon oils with strong sulfuric acid, the acid sludges which are obtained as the result of a previous treatment of a batch of the same oil or the separate treatment of another oil with strong acid. It is generally necessary in such cases to increase the acid content of the acid sludge to obtain an acid concentration of about 93 per cent $H_2SO_4$. It has been proposed also to accomplish substantially the same thing by treating a distillate first with an acid sludge and then with strong sulfuric acid; in this way compensating for the weaker acidity of the acid sludge. It is desirable to employ acid sludges in treating, because such sludges are generally available in a refinery and are much less expensive to use than fresh sulfuric acid or sulfuric acid recovered by conventional procedures from the acid sludges, the so-called "black acid." Fresh sulfuric acid and black acid may be generically referred to as sulfuric acid substantially free from organic impurities, this terminology also including other recovered sulfuric acids of inconsequential organic content.

While the usual acid sludge is one that is obtained as a by-product from the acid treatment of a hydrocarbon oil, an important acid sludge is the sludge or spent acid formed in the process of alkylating isoparaffin hydrocarbons with olefin hydrocarbons in the presence of sulfuric acid. Acid sludges of this type are described in U. S. Patent 2,267,458 to A. R. Goldsby and are shown to be satisfactory treating agents for hydrocarbon oils.

In the research leading to the development of the present invention, we attempted to employ various acid sludges, and particularly spent alkylation acid sludge, for the treatment of cracked distillates, so as to remove substantially all of the inherent gum while avoiding polymerization resulting in the formation of synthetic gum. Thus, we treated cracked distillates with acid sludges containing between 55 and 60 per cent $H_2SO_4$ (corrected for organic content) and also employed acid sludges containing lesser amounts of $H_2SO_4$. We found, however, that these acid sludges apparently were ineffective in reducing the gum content of the distillates, since conventional tests showed that the distillates contained increased, rather than reduced amounts of gum.

It is a principal object of the present invention to provide a novel and economical process for the acid treatment of cracked distillates with the utilization of weak acid sludges.

Another object of the invention is to provide a process of acid treatment using a spent alkylation acid sludge to reduce the gum content of a cracked distillate.

Another object of the invention is to provide a process of acid treating cracked distillates, wherein the acid sludges obtained from a prior treatment of a cracked distillate may be utilized effectively for removing the inherent gum from the distillate, while avoiding polymerization.

Other objects of the invention in part will be obvious and will in part appear hereinafter.

We have discovered in accordance with the invention that a thermally cracked hydrocarbon distillate can be effectively treated to reduce the inherent gum content while avoiding polymerization and to produce a finished product of good color by contacting the distillate with an acid sludge containing between about 40 and 60 per cent $H_2SO_4$, and preferably between about 55 and 60 per cent $H_2SO_4$, and then with a smaller amount of fresh or recovered (regenerated) sulfuric acid of about 55 to 60 per cent strength. This treatment has been found to be especially effective if the acid sludge employed is spent alkylation acid sludge.

As previously discussed, the initial treatment with the acid sludge apparently is ineffective in reducing the gum content of the distillate; also the treatment with the acid sludge results in discoloration of the distillate. We have discovered, however, that the gum content can be reduced to an amount well below specifications by treating the distillate separated from the sludge with a relatively small amount of sulfuric acid containing 55 to 60 per cent $H_2SO_4$. At the same time, color bodies are removed from the distillate.

We now believe that the reason for the apparent ineffectiveness of the treatment with the acid sludges is not that the sludges do not remove the inherent gum from the cracked distillates, as the initial results seemed to show. On the contrary, it appears that an acid sludge is effective to remove the inherent gum, and also does not cause polymerization of compounds present in the distillate. The reason for the apparent ineffectiveness of the acid sludges seems to be that polymers and nitrogen compounds, which are present in acid sludges, dissolved in the cracked distillate. The following treatment with a relatively smaller amount of acid was effective to remove these polymers and nitrogen compounds and yield a finished product of low gum content and good color. Whatever the explanation, the present process makes possible the effective weak acid treatment of cracked distillates utilizing for the major part of the treatment the acid sludges which in many refineries are waste materials.

We have also discovered that the final treatment with a relatively small amount of sulfuric acid of about 55 to 60 per cent $H_2SO_4$ content makes possible the reuse of sludge separated from the cracked distillate after treatment with either or both an acid sludge and sulfuric acid. It had been our prior experience that although the acid sludge separated from a cracked distillate, whether an acid sludge or sulfuric acid was employed, contained a substantial amount of $H_2SO_4$, it was not possible to bring this sludge back up to the desired $H_2SO_4$ content and reuse it, because its use resulted in a distillate having a high gum content and bad color. For example, the acid sludge resulting from treating a cracked distillate with sulfuric acid of about 57 per cent strength may contain about 52 per cent $H_2SO_4$. This acid sludge may be brought back to 57 per cent strength by addition of fresh acid or a stronger acid sludge, but, as such, this sludge is not suitable for use for treating a cracked distillate in the usual way. However, by using this sludge in the initial treatment of a cracked distillate and then completing the treatment with sulfuric acid of 55 to 60 per cent strength, it is possible to accomplish satisfactory treatment of the distillate.

The process has been practiced for the treatment of a thermally cracked naphtha having an A. P. I. gravity of about 54° and having a gum content of 10 milligrams per 100 cc., as determined by a test consisting of heating a 100 cc. portion of the distillate in a glass dish on a steam bath to remove all volatile matter and then drying in an oven, the gum being the material remaining in the dish. The color of the naphtha was plus 4, Saybolt. This naphtha was treated in one dump with a spent alkylation acid sludge of about 55 per cent $H_2SO_4$ content prepared as described below, using 4 pounds of the spent alkylation acid sludge for each barrel of naphtha, and agitating while maintaining a temperature of about 80° F. After separating the resulting sludge, the partially treated naphtha had a gum content by the glass dish method of 25 milligrams and the color was minus 10, Saybolt. The naphtha was then treated with plant recovered acid of about 57 per cent $H_2SO_4$ content in the proportions of one pound per barrel. The resulting sludge was then separated and the naphtha was neutralized with caustic and washed. The product obtained had a gum content of about 2 milligrams and a color of plus 12, Saybolt.

The spent alkylation acid sludge used in this process was prepared from the acid sludge obtained as a by-product in the alkylation of isoparaffins, such as isobutane, with olefin hydrocarbons, such as cracking still gases containing $C_3$ and $C_4$ hydrocarbons in the well-known manner. The acid used in the alkylation contained about 97 per cent $H_2SO_4$, and the sludge acid obtained contained about 90 per cent $H_2SO_4$ by titration, and about 3 to 6 per cent by weight organic material dissolved therein. This acid sludge was diluted to 55 per cent $H_2SO_4$ (acidity corrected for organic matter) to prepare it for use as described above. Other suitable acid sludges of this class are disclosed in U. S. Patent 2,267,458, discussed above.

The process has also been practiced using an acid sludge obtained following the treatment of a thermally cracked distillate, such as described above, with fresh or recovered sulfuric acid of about 57 per cent $H_2SO_4$ content. This sludge contained about 52 per cent $H_2SO_4$. The $H_2SO_4$ content of the sludge was brought up to 57 per cent by the addition of strong sulfuric acid. A relatively strong acid sludge could also be used for this purpose. This acid sludge was then used in the manner described above for the treatment of a cracked naphtha distillate. After treating with a smaller amount of 55 to 60 per cent $H_2SO_4$, and neutralizing, a distillate of low gum content and good color was obtained.

It will be understood that these examples are merely illustrative of the invention and that other acid sludges, such as the sludge obtained by treating straight run naphtha with strong sulfuric acid, can be used with similar results. A suitable acid sludge can be prepared by diluting the acid sludge disclosed in U. S. Patent 2,267,458.

The time of the treatment with the acid sludge and with the sulfuric acid can be varied depending upon the temperature, amounts of reagents used, and specific characteristics of the cracked distillate. Ordinarily, temperatures of the order of 75° F. to 100° F. are satisfactory, although lower and higher temperatures can be used by adjusting the contact time. Under favorable conditions of temperature and agitation and using one dump for the acid sludge and one for the sulfuric acid, contact times for each dump of less than one minute have been found to be satisfactory.

The total amount of acid used in the process is in general about the same as when sulfuric acid of 55 to 60 per cent $H_2SO_4$ content is used alone in the treatment. If desired, a larger total amount of acid may be used, and this may be done economically because the acid sludges are cheap and readily available. A total of about 2 to 12 pounds of acid sludge and acid per barrel of cracked distillate may be used. For the typical thermally cracked naphtha, however, about 4 to 6 pounds of acid sludge and acid should be used.

The relative proportions of acid sludge and acid may also be varied. A larger amount of the acid sludge than the acid should be used, however, since the removal of inherent gum (e. g. diolefins) is preferably accomplished almost entirely by the acid sludge, the action of the acid being restricted to removing materials dissolved out of the sludge, such as polymers and nitrogen compounds. We have found that entirely satisfactory results are obtained when the weight ratio between the acid sludge and the acid lies within the range of about 2:1 to 5:1, with ratios from 3:1 to 4:1 being especially preferred.

It will be understood that the acid sludges adapted for use in the present process will vary somewhat in composition and properties. It is preferred to employ sludges containing not over 20 per cent by weight dissolved organic material. Thus, sludges obtained from the acid treatment of naphtha and kerosene fractions are particularly important examples of sludges resulting from the acid treatment of hydrocarbon oils.

Since the process does not result in any substantial removal of sulfur compounds, it is usually desirable also to treat the distillate for sulfur. Any conventional method may be used; for example, the products of the process may be sweetened effectively by subjecting them to doctor treatment.

Obviously many modifications and variations of the invention, as hereinbefore set forth, may be made without departing from the spirit and scope thereof, and therefore only such limitations should be imposed as are indicated in the appended claims.

We claim:

1. A process of acid treating a thermally cracked petroleum distillate to remove gumforming constituents which comprises contacting the distillate with an acid sludge containing about 40 to 60 per cent $H_2SO_4$, separating the distillate from the resulting sludge, then contacting the distillate with sulfuric acid of about 55 to 60 per cent strength selected from the group consisting of fresh sulfuric acid and regenerated sludge acid, and separating the distillate from the sludge formed, the treated distillate being characterized by a reduced gum content and good color.

2. A process of acid treating a thermally cracked naphtha distillate to remove gumforming constituents which comprises contacting the distillate with an acid sludge containing about 55 to 60 per cent $H_2SO_4$, separating the resulting sludge, then contacting the distillate with an amount of sulfuric acid of about 55 to 60 per cent strength selected from the group consisting of fresh sulfuric acid and regenerated sludge acid, said amount of sulfuric acid being smaller than the amount of acid sludge employed, separating the distillate from the sludge formed, and neutralizing the acid-treated distillate, the resulting treated distillate being characterized by reduced gum content and a good color.

3. A process in accordance with claim 2 wherein the acid sludge used is prepared by diluting an acid sludge obtained from the alkylation of isoparaffins with olefins in the presence of strong sulfuric acid.

4. A process in accordance with claim 2 wherein the acid sludge is obtained by treating a light petroleum distillate with a strong sulfuric acid composition, and diluting the sludge formed to an $H_2SO_4$ content of about 55 to 60 per cent.

5. A process in accordance with claim 2 wherein the weight ratio between the amount of acid sludge and sulfuric acid used lies within the range of about 2:1 to 5:1.

6. A process in accordance with claim 2 wherein the sulfuric acid employed is fresh sulfuric acid.

7. A process in accordance with claim 2 wherein the total amount of acid sludge and sulfuric acid is not substantially greater than the amount of sulfuric acid of about 55 to 60 per cent strength substantially free from organic impurities which would be required to produce a treated distillate of the same gum content and color.

8. A process of acid treating a thermally cracked naphtha distillate to remove gumforming constituents which comprises contacting the distillate with a strengthened acid sludge prepared as described below and containing about 55 to 60 per cent $H_2SO_4$, separating the resulting sludge, then contacting the distillate with an amount of sulfuric acid of about 55 to 60 per cent strength selected from the group consisting of fresh sulfuric acid and regenerated sludge acid, said amount of sulfuric acid being smaller than the amount of strengthened acid sludge employed, separating the distillate from the sludge formed, and neutralizing the acid-treated distillate, said strengthened acid sludge being obtained by treating a thermally cracked naphtha distillate with a sulfuric acid composition containing about 55 to 60 per cent $H_2SO_4$, separating an acid sludge containing less than 55 per cent $H_2SO_4$, adding to said acid sludge containing less than 55 per cent $H_2SO_4$, $H_2SO_4$ in amount sufficient to bring the strength up to about 55 to 60 per cent $H_2SO_4$ and to produce said strengthened acid sludge.

9. A process of acid treating a thermally cracked naphtha distillate to remove gumforming constituents which comprises contacting the distillate with a strengthened acid sludge prepared as described below and containing about 55 to 60 per cent $H_2SO_4$, separating the resulting sludge, then contacting the distillate with an amount of sulfuric acid of about 55 to 60 per cent strength selected from the group consisting of fresh sulfuric acid and regenerated sludge acid, said amount of sulfuric acid being smaller than the amount of strengthened acid sludge employed, separating the distillate from the sludge formed, and neutralizing the acid-treated distillate, said strengthened acid sludge being obtained by treating a thermally cracked naphtha distillate with an acid sludge prepared by diluting to an $H_2SO_4$ content of about 55 to 60 per cent the acid sludge obtained from the alkylation of isoparaffins with olefins in the presence of strong sulfuric acid, separating an acid sludge containing less than 55 per cent $H_2SO_4$, adding to said acid sludge containing less than 55 per cent $H_2SO_4$, $H_2SO_4$ in amount sufficient to bring the strength up to about 55 to 60 per cent $H_2SO_4$ and to produce said strengthened acid sludge.

WILLIAM J. RYAN.
MARCUS T. KENDALL.